Patented Mar. 14, 1939

2,150,698

UNITED STATES PATENT OFFICE 2,150,698

WATER SOLUBLE THERMOSETTING RESIN AND METHOD OF MAKING SAME

James V. Nevin, Aberdeen, Wash.

No Drawing. Application August 11, 1937, Serial No. 158,474

7 Claims. (Cl. 260—30)

This invention relates to water solutions of partial condensation products of a methylene condensing agent, such as an aldehyde, and a cresol or a xylenol and includes a process of making such solutions.

More specifically this invention relates to the production of cresylic acid-formaldehyde condensation products that are soluble in water and are capable of being set into hard, infusible masses by the application of heat.

The water soluble resins of this invention have many uses in the art. They may be used alone or in combination with filling materials for forming pressed or molded articles. They are excellent binders or bonding agents useful in preparing laminated articles such as plywood and the like. They also have valuable film forming properties and can be used in varnishes and other coating or impregnating agents.

This application is a continuation-in-part of my copending application entitled: "Method of making plywood", Serial No. 741,745, filed August 27, 1934.

Alkaline solutions of phenol-aldehyde resins are known. However, when a cresol or a xylenol is used in place of phenol in the formation of an aldehyde condensation product, the resulting product is insoluble in water and will precipitate upon dilution of the reaction mass with water. Therefore, while it is highly desirable to substitute a cheaper cresol such as cresylic acid (meta cresol) for the more expensive phenol in preparing aldehyde condensation products, such substitution has heretofore not been possible for the production of water soluble resins.

According to this invention cresylic acid, or a xylenol, is reacted exothermically with a methylene condensing agent, such as formaldehyde, in the presence of not less than 10% sodium hydroxide, or an equivalent amount of other alkali, until a partial condensation product is obtained. Any further reaction is then arrested by the addition of water containing 6% sodium hydroxide based on the weight of the cresylic acid or xylenol originally introduced into the reacting mass. The resulting syrupy solution can be diluted with water in all proportions without precipitating the resin. Therefore I am now able to produce an aqueous solution of a cresylic acid-aldehyde resin.

Hydroxy aromatic compounds such as phenol, resorcinol, beta-naphthol, hydroquinone and the like, can be used to replace some of the cresylic acid or xylenol in forming the resins of this invention. These agents combine with any free aldehyde present in the reacting mixture to form additional resinous compounds which serve as hardening agents when the product is subjected to heat and pressure for forming an infusible, insoluble "C" stage resin.

Small amounts of a gum such as gum accroides can be incorporated in the reaction mixture to increase the bonding qualities of the product.

Small amounts of dispersing agents such as oleic acid and triethanolamine may be incorporated if desired.

It is then an object of this invention to prepare a stable, aqueous solution of a thermo-setting resin.

A further object of this invention is to prepare solutions of methylene condensation products of cresylic acid or a xylenol that are miscible in water in all proportions.

A further object of this invention is to provide a stable colloidal solution of a cresylic acid-aldehyde condensation product.

Another object of this invention is to provide a process of reacting cresylic acid or a xylenol with an aldehyde in the presence of a condensing agent to produce a thermo-plastic resin solution that is miscible in water in all proportions.

A further object of this invention is to control the exothermic reaction between cresylic acid and formaldehyde for the production of a water-soluble resin.

Another object of this invention is to react cresylic acid with formaldehyde in the presence of not less than 10% of an alkali condensing agent, based on the weight of the cresylic acid, and to arrest the ensuing exothermic reaction with water containing not less than 6% alkali metal hydroxide dissolved therein based on the weight of the cresylic acid, to produce a solution of a water-soluble thermoplastic resin that is miscible in water in all proportions.

Other and further objects of this invention will become apparent from the following examples which set forth preferred procedures for preparing the products of this invention.

Example I 400 parts by weight of cresylic acid are placed in a jacketed digester together with 432 parts by weight of a 37% to 40% formaldehyde solution. 0.6 part by weight of oleic acid and 1.5 parts by weight of triethanolamine are introduced into the digester and the ingredients are agitated for about one minute to bring about a thorough mixing thereof. The temperature of the mixture is then adjusted so that it will not exceed 62° F.

123 parts by weight of a 32.5% aqueous sodium hydroxide solution is prepared and adjusted in temperature not to exceed 60° F. This solution contains 40 parts by weight of NaOH which is equivalent to 10% of the weight of the cresylic acid in the digester.

The sodium hydroxide solution is then added to the mixture of chemicals in the digester and the resulting mass thoroughly agitated. This immediately starts an exothermic reaction, and after one minute the temperature of the mass rises to about 68° F. This temperature increases gradually until a somewhat constant temperature of 208° F. is reached in about thirty-five minutes.

Any further reaction is now arrested by the addition of 1000 parts by weight of water containing 24 parts by weight of sodium hydroxide. The 24 parts by weight of sodium hydroxide is equivalent to 6% of the weight of the cresylic acid.

After the addition of the 1000 parts of weak alkaline aqueous solution, water is circulated through the jacketed digester to bring the mass down to room temperature.

The product is a syrup having a density between 10° and 12° Bé., and a viscosity of about 125 centipoises at 87° F. The solid content of the syrup is between 28 to 30% solids. The syrup has a pH value of about 11.4 and can be diluted with water to any amount desired without effecting a precipitation of the condensation product.

If less than 10% of sodium hydroxide, or an equivalent amount of other alkali, based on the weight of the cresylic acid, is used as a condensing agent, a water soluble product will not be obtained. Likewise, if less than 6% of sodium hydroxide, or an equivalent amount of other alkali metal hydroxide, based on the weight of the cresylic acid, is used in the solvent water for arresting the reaction a precipitation of the resin will result.

The exothermic reaction can be carefully controlled by adjusting the initial temperatures of the reacting ingredients. The period of reaction may be considerably reduced in time by adjusting the initial temperatures of the reacting ingredients to temperatures higher than those indicated above but it is then difficult to arrest the reaction at the proper point.

The syrupy product obtained can be readily passed through fine quantitative filters without leaving a trace of residue on the filters. The syrup shows the tyndal effect and does not precipitate or separate on prolonged standing. These characteristics identify the syrup as an aqueous colloidal solution.

*Example II*

A modified water-soluble cresylic acid resin can be obtained by dissolving 10 parts by weight of resorcinol in 400 parts by weight of cresylic acid and using the same other ingredients in the proportions indicated in Example I. The same procedure may be followed except that the temperature of the initial ingredients may be adjusted to not exceed 80° F. before the aqueous hydroxide solution is added. This hydroxide solution may be adjusted to a temperature not exceeding 88° F.

The reaction proceeds exothermically after the addition of the hydroxide solution for about fifteen to sixteen minutes when a somewhat constant temperature around 221° F. is reached. The reaction is then arrested by the addition of the solvent water as described in Example I.

The colloidal solution thus obtained has a viscosity of 74 centipoises at 87° F., and has a density between 10° to 12° Bé.

*Example III*

In place of the resorcinol in Example II, 10 parts by weight of hydroquinone may be used, and instead of using the 400 parts of cresylic acid, 200 parts by weight may be used plus 100 parts of phenol and 100 parts of xylenol. The oleic acid may be omitted and 2 parts of triethanolamine used in place of 1.5 parts, as set forth in Example I.

The same procedure outlined in Example I is followed but the mass is allowed to reach a temperature of about 214° F. before the reaction is arrested with the solvent water. This temperature of 214° F. is reached after about forty minutes.

The colloidal solution or syrup obtained has about the same density as the solution obtained in Examples I and II, but has a viscosity of 87-90 centipoises at 87° F.

*Example IV*

16 parts of gum accroides may be added to the initial reacting ingredients of Example I. After the sodium hydroxide solution is placed in the digester, the reaction is allowed to proceed exothermically until the temperature remains somewhat constant at 204° F. This temperature is reached in about forty minutes.

In incorporating the gum accroides into the reacting ingredients it is desirable to dissolve the powdered gum in the cresylic acid and strain the resulting solution to eliminate all particles of gritty matter.

The density of the solution obtained is between 11° and 12° Bé., and the viscosity of the solution is 87-90 centipoises at 87° F.

*Example V*

In place of the 10 parts of resorcinol used in Example II, 20 parts of beta-naphthol can be dissolved in the cresylic acid. The oleic acid may be omitted if desired and 2 parts by weight of triethanolamine used instead of 1.5 parts.

The same procedure outlined in Example II is followed and at the end of about fifteen to sixteen minutes a temperature around 215° F. is reached.

The resulting product has a viscosity of 124 centipoises at 87° F. and a density between 11° and 12° Bé.

*Example VI*

In place of the 400 parts of cresylic acid used in Example I, 400 parts of a xylenol, a homologue of cresylic acid, can be used. The same procedure outlined in Example I is followed and the same other ingredients are used in the proportions indicated.

The resulting solution has a viscosity of 130 centipoises at 87° F.

*Example VII*

In the following example, a modified cresylic acid resin is formed containing phenol.

200 parts by weight of phenol, 600 parts by weight of cresylic acid, and 864 parts by weight of a 37%–40% formaldehyde solution are mixed together in a digester. The temperature of the ingredients is adjusted not to exceed 78° F. 246 parts by weight of 32.5% aqueous sodium hydroxide solution is adjusted in temperature not to exceed 72° F. and is introduced into the digester. The ingredients are thoroughly mixed by an agitator and react exothermically for about thirty-five minutes when a temperature around 220° F. is reached.

The reaction is then checked by the addition of 1000 parts by volume of methanol containing 48 parts by weight of sodium hydroxide or potassium hydroxide. This methanol solution may also have dissolved therein 1 part by weight of oleic acid and 2 parts by weight of triethanolamine.

The resulting syrup is a colloidal solution that may be diluted with water in all proportions without effecting a precipitation of the resin. The solution is clear and shows no trace of cloudiness or turbidity.

The methanol used in this example is a substitute for the water used in the other examples.

*Example VIII*

800 parts by weight of cresylic acid, 864 parts by weight of a 37%–40% formaldehyde solution, 10 parts by weight of sesame oil, and 5 parts by weight of triethanolamine are mixed together in a digester. The temperature of the ingredients is adjusted not to exceed 62° F. 123 parts of a 32.5% sodium hydroxide solution in water is then incorporated in the digester and an exothermic reaction between the ingredients ensues as outlined in Example I.

The reaction is checked when temperatures around 208° F. are reached by the addition of 1200 parts by volume of methanol containing 48 parts by weight of sodium hydroxide.

The resulting product has a density between 5.6° and 9° Bé.

If desired 600 parts by volume of water and 600 parts by volume of methanol may be used in the checking solution in place of 1200 parts of methanol.

*Example IX*

The following example illustrates how the process of this invention can be followed to make a dry, powdered resin that is capable of being redissolved in alcohol or water.

114 parts by weight of phenol, 300 parts by weight of cresylic acid, and 432 parts by weight of a 37%–40% formaldehyde solution are mixed together in a digester. 123 parts by weight of a 32.5% sodium hydroxide solution in water are incorporated into the digester. The ingredients react exothermically upon the incorporation of the sodium hydroxide solution until a temperature around 220° F. is reached. The reaction mixture is then rapidly cooled until it is reduced in temperature to 100° F. A gentle heat is applied to the mixture to maintain the same at 100° F. until all of the water present is evaporated and the resinous mass is completely free from all traces of moisture.

The dry partial condensation product is then ground in a suitable mill to a fine, pulverized state. The powder may be dissolved in a solvent comprising 500 parts of water by volume, 700 parts of methanol by volume and 24 parts of sodium of potassium hydroxide by weight. The solvent completely dissolves the powdered resin and a colloidal solution is obtained having a density of about 12° Bé and a viscosity of about 35 centipoises at 87° F.

If desired a small quantity of a wetting agent can be incorporated into the product to impart better penetrating properties to the solution.

In the above examples, the initial reacting ingredients have been adjusted to temperatures around room temperatures, unless a modified resin containing phenol is being made, when temperatures above room temperatures may be used. It should be understood, however, that the initial temperatures may be widely varied from room temperatures and that the temperatures set forth in the examples are used only to permit better control of the exothermic reaction. If high initial temperatures are used, the condensation proceeds with such rapidity that further reactions cannot be prevented and an insoluble resin will be produced. The resins of this invention are only partially polymerized and will form highly useful commercial solutions.

The methylene condensing agent, such as formaldehyde, is preferably used in slight excess over equal molecular proportions with the cresylic acid or xylenol to make up for losses due to evaporation and to produce a harder resin. However, equal molecular proportions are operative.

The colloidal solutions produced according to this invention can be used as bonding agents for plywood, as impregnating or sizing agents, as binders in the manufacture of fibre board or vegetable fibrous material, and as coating agents. The solution, when dried, sets under heat to form a film that is highly resistant to termites, live steam, solvents, acids and alkalies.

I claim as my invention:

1. The method of making aqueous solutions of condensation products adapted to be diluted with water to any degree without precipitation of the condensation products which comprises reacting a cresylic acid with a methylene-containing compound in the presence of an amount of alkali condensing agent equivalent to not less than 10% of sodium hydroxide based on the weight of the cresylic acid until a partial condensation product is formed and arresting further reaction by incorporating in the reaction mass an aqueous solution containing an alkali metal dissolved therein equivalent to not less than 6% sodium hydroxide based on the weight of the cresylic acid.

2. The method of making an aqueous solution of a cresylic acid-formaldehyde partial condensation product capable of being diluted with water in all proportions without precipitation of the product which comprises mixing together a cresylic acid and formaldehyde in the presence of an amount of alkali metal hydroxide equivalent to not less than 10% of sodium hydroxide based on the weight of the cresylic acid, allowing the mixture to react exothermically until somewhat constant temperatures are reached and arresting the reaction by incorporating a weak, alkaline aqueous solution containing an amount of alkali metal hydroxide equivalent to not less than 6% of sodium hydroxide based on the weight of the cresylic acid.

3. The process of making an aqueous solution of a thermo-setting partial condensation product of cresylic acid and formaldehyde capable of being diluted with water in all proportions without precipitation of the product which comprises mixing together cresylic acid and an aqueous solution of formaldehyde at room temperatures in the presence of not less than 10% of sodium hydroxide based on the weight of the cresylic acid, allowing the mixture to react exothermically for about 35 minutes until somewhat constant temperatures around 208° F. are reached and arresting further reaction by dumping into the reaction mass an aqueous solution of sodium hydroxide containing not less than 6% of sodium hydroxide based on the weight of the cresylic acid.

4. The method of making an aqueous solution of a thermo-setting partial condensation product which comprises exothermically reacting a mixture of a cresylic acid and a different phenol with a methylene-containing compound in the presence of an amount of an alkali condensing agent equivalent to not less than 10% of sodium hydroxide based on the weight of the cresylic acid and different phenol until a partial condensation product is formed and arresting further reaction by incorporating in the reaction mass an aqueous solution containing an alkali dissolved therein equivalent to not less than 6% sodium hydroxide based on the weight of the cresylic acid and different phenol.

5. An aqueous solution of a partial condensation product of a cresylic acid and a methylene-containing compound miscible with water in all proportions without precipitation of the condensation product and obtainable by the process of claim 1.

6. An aqueous solution of a cresylic acid-formaldehyde condensation product miscible with water in all proportions without precipitation of the product and having a ratio of alkali condensing agent to cresylic acid equivalent to not less than 16 parts of sodium hydroxide to 100 parts of cresylic acid, said product obtainable by the process of claim 2.

7. An aqueous solution of a partial condensation product of a cresylic acid and a different phenol with a methylene containing compound miscible with water in all proportions without precipitation of the condensation product and obtainable by the process of claim 4.

JAMES V. NEVIN.